(12) United States Patent
Xia et al.

(10) Patent No.: US 8,406,081 B2
(45) Date of Patent: Mar. 26, 2013

(54) SEISMIC IMAGING SYSTEMS AND METHODS EMPLOYING TOMOGRAPHIC MIGRATION-VELOCITY ANALYSIS USING COMMON ANGLE IMAGE GATHERS

(75) Inventors: Fan Xia, Qiaodong (CN); Yiqing Ren, Beijing (CN); Shengwen Jin, Sugarland, TX (US)

(73) Assignee: Landmark Graphics Corporation, Houston, TX (US)

( * ) Notice: Subject to any disclaimer, the term of this patent is extended or adjusted under 35 U.S.C. 154(b) by 646 days.

(21) Appl. No.: 12/566,885

(22) Filed: Sep. 25, 2009

(65) Prior Publication Data

US 2011/0075516 A1    Mar. 31, 2011

(51) Int. Cl.
*G01V 1/00*    (2006.01)
(52) U.S. Cl. ............................................ 367/73; 702/18
(58) Field of Classification Search .................... 367/37, 367/38, 50, 51, 53, 73; 702/18
See application file for complete search history.

(56) References Cited

U.S. PATENT DOCUMENTS

| | | | |
|---|---|---|---|
| 5,138,584 A | 8/1992 | Hale | |
| 5,274,605 A | 12/1993 | Hill | |
| 5,490,120 A | 2/1996 | Li et al. | |
| 5,530,679 A | 6/1996 | Albertin | |
| 5,784,334 A | 7/1998 | Sena et al. | |
| 6,002,642 A | 12/1999 | Krebs | |
| 6,311,131 B1 | 10/2001 | Peardon et al. | |
| 6,687,618 B2 * | 2/2004 | Bevc et al. | 702/14 |
| 6,864,890 B2 * | 3/2005 | Meek et al. | 345/440 |
| 7,065,004 B2 | 6/2006 | Jiao et al. | |
| 7,196,969 B1 | 3/2007 | Karazincir et al. | |
| 7,315,783 B2 | 1/2008 | Lou | |
| 7,376,517 B2 * | 5/2008 | Rickett | 702/17 |
| 2002/0033832 A1 | 3/2002 | Glatman | |
| 2005/0207278 A1 | 9/2005 | Reshef et al. | |
| 2005/0270537 A1 | 12/2005 | Mian et al. | |
| 2008/0130411 A1 | 6/2008 | Brandsberg-Dahl et al. | |

OTHER PUBLICATIONS

PCT International Search Report and Written Opinion, dated Feb. 20, 2009, Appl No. PCT/US/0931400, "Data Acquisition and Prestack Migration Based on Seismic Visibility Analysis", filed Jan. 19, 2009, 9 pgs.
PCT International Search Report and Written Opinion, dated Jun. 8, 2009, Appl No. PCT/US2009/040793, "Seismic Imaging Systems and Methods Employing a Fast Target-Oriented Illumination Calculation", filed Apr. 16, 2009, 9 pgs.
Baysal, Edip et al., "A Two-Way Nonreflecting Wave Equation", Geophysics, vol. 49, No. 2, (Feb. 1984), pp. 132-141, 11 Figs.
Baysal, Edip et al., "Reverse Time Migration", Geophysics, vol. 48, No. 11, (Nov. 1983), pp. 1514-1524, 9 Figs.

(Continued)

*Primary Examiner* — Mark Hellner
*Assistant Examiner* — Krystine Breier
(74) *Attorney, Agent, or Firm* — Krueger Iselin LLP; Bradley A. Misley (57) ABSTRACT

In at least some embodiments, the system obtains shot gathers for a survey region and migrates the shot gather data with an initial velocity model to obtain angle-domain common image gathers. The system processes the common image gathers to determine depth residuals and corresponding angle-dependent time deviations throughout a seismic survey region. The system solves a set of tomographic equations which employ ray theory to establish a relationship between a travel time deviation and the depth residual of a reflector in the depth-offset ray parameter (z,p) domain. The resulting updates are applied to the velocity model and can be used to re-migrate the shot gather data. The system generates a representation of the survey region that can be displayed to a user.

20 Claims, 4 Drawing Sheets

OTHER PUBLICATIONS

Bear, Glenn et al., "The Construction of Subsurface Illumination and Amplitude Maps via Ray Tracing", The Leading Edge, 19(7), (2000), pp. 726-728.

Chang, W. F., et al., "3D Acoustic Prestack Reverse-Time Migration", Geophysical Prospecting 38, (1990), pp. 737-755.

Etgen, John T., "Residual Prestack Migration and Interval-Velocity Estimation", Printed as Stanford Exploration Project No. 68, Copyright 1990, (Oct. 1990), pp. ii-xiii.

Fomel, Sergey "Migration and Velocity Analysis by Velocity Continuation", Stanford Exploration Project, Report Sergey,, (Nov. 9, 2000), pp. 6411-6670.

Hoffmann, Jorgen "Illumination, Resolution and Image Quality of PP- and PS-Waves for Survey Planning", The Leading Edge, 20(9), (2001), pp. 1008-1014.

Jin, Shengwen et al., "Depth Migration Using the Windowed Generalized Screen Propagators", 1998 SEG Expanded Abstracts, (1998), pp. 1-4.

Jin, Shengwen et al., "Illumination Amplitude Correction with Beamlet Migration", Acquistion/Processing, The Leading Edge, (Sep. 2006), pp. 1045-1050.

Jin, Shengwen et al., "One-Return Wave Equation Migration: Imaging of Duplex Waves", SEG/New Orleans 2006 Annual Meeting, New Orleans, LA, (Oct. 2006), pp. 2338-2342.

Jin, Shengwen et al., "U.S. Patent Application", "One-Return Wave Equation Migration Utility", U.S. Appl. No. 11/606,551, filed Nov. 30, 2006.

Kuehl, Henning et al., "Generalized Least-Squares DSR Migration Using a Common Angle Imaging Condition", SEG Conference, San Antonio, Texas, (Fall 2001), 4 pgs.

Liu, Zhenyue "An Analytical Approach to Migration Velocity Analysis", Geophysics, vol. 62, No. 4, (Jul. 1998), pp. 1238-1249, 17 Figs, 1 Table.

Luo, M. et al., "Amplitude Recovery from Back Propagated Waves to True Scattered Waves", Technical Report No. 12, Modeling and Imaging Project, University of California, Santa Cruz, (2005), pp. 25-34.

Luo, Mingqui et al., "3D Beamlet Prestack Depth Migration Using the Local Cosine Basis Propagator", Modeling and Imaging Laboratory, IGPP, University of California, Santa Gruz, CA, (2003), pp. 1-4.

McMechan, G. A., "Migration by Extrapolation of Time-Dependent Boundary Values", Geophysical Prospecting 31, (1983), pp. 413-320.

Meng, Zhaobo et al., "3D Global Tomographic Velocity Model Building", SEG Int'l Exposition and 74th Annual Meeting, Denver, Colorado, (Oct. 10, 2004), pp. 1-4.

Muerdter, David et al., "Understanding Subsalt Illumination through Ray-Trace Modeling, Part 1: Simple 2 D Salt Models", The Leading Edge, 20(6), (2001), pp. 578-594.

Muerdter, David et al., "Understanding Subsalt Illumination through Ray-Trace Modeling, Part 2: Dippling Salt Bodies, Salt Peaks, and Non-reciprocity of Subsalt Amplitude Response", The Leading Edge, 20(7), (2001), pp. 687-688.

Muerdter, David et al., "Understanding Subsalt Illumination Through Ray-Trace Modeling, Part 3: Salt Ridges and Furrows, and Impact of Acquisition Orientation", The Leading Edge, 20(8), (2001), pp. 803-816.

Prucha, Marie L., et al., "Angle-Domain Common Image Gathers by Wave-Equation Migration", Stanford Exploration Project, Report 100,, (Apr. 20, 1999), pp. 101-113.

Sava, Paul "Wave-Equation Migration Velocity Analysis—I: Theory", Stanford Exploration Project, (Jul. 22, 2004), pp. 1-37.

Sava, Paul C., et al., "Angle-Domain Common-Image Gathers by Wavefield Continuation Methods", Geophysics, vol. 68, No. 3, (May 2003), pp. 1065-1074, 14 Figs.

Schneider, William A., et al., "Efficient and Accurate Modeling of 3-D Seismic Illumination", SEG Expanded Abstracts 18, (Fall 1999), pp. 633-636.

Stoffa, P. L., et al., "Split-Step Fourier Migration", Geophysics, vol. 55, No. 4, (Apr. 1990), pp. 410-421, 11 Figs.

Tistow, Dietrich et al., "Fourier Finite-Difference Migration", Geophysics, vol. 59, No. 12, (Dec. 1984),pp. 1882-1893.

Van Trier, Johannes A., "Tomographic Determination of Structural Velocities from Depth-Migrated Seismic Data", Printed as Stanford Exploration Project No. 66, (1990), pp. ii-xii.

Whitmore, N. D., "Iterative Depth Migration by Backward Time Propagation", Seismic 10-Migration, S10.1, (1983), pp. 382-385.

Wu, R. S., et al., "Mapping Directional Illumination and Acquisition-Aperture Efficacy by Beamlet Propagator", SEG Expanded Abstracts 21, (2002), p. 1352.

Xia, Fan et al., "Tomographic Migration-Velocity Analysis Using Common Angle Image Gathers", SEG Annual Conference, Las Vegas, Nevada, (Nov. 9, 2008), pp. 3103-3107.

Xie, Xiao B., et al., "Extracting an Angle Domain Information from Migrated Wavefield", SEG 72nd Annual Meeting, Expanded Abstracts 21, (Oct. 6, 2002), p. 1352.

Xie, Xiao B., et al., "Three-Dimensional Illumination Analysis Using Wave Equation Based Propagator", SEG Expanded Abstracts 22, (2003), pp. 1360-1363.

Xie, Xiao-Bi et al., "Wave-Equation-Based Seismic Illumination Analysis", Geophysics, vol. 71, No. 5, (Sep. 20, 2006), pp. S169-S177, and 10 Figs.

Xu, Shiyong et al., "An Orthogonal One-Return Wave Equation Migration", SEG San Antonio 2007 Annual Meeting, San Antonio, TX, (2007), 5 pgs.

Xu, Shiyong et al., "Can We Image Beneath Salt Body—Target-Oriented Visibility Analysis", SEG Houston 2005 Annual Meeting, SPMI 6.8, Houston, TX, (2005), 5 pgs.

Xu, Shiyong et al., "Wave Equation Migration of Turning Waves", SEG New Orleans 2006 Annual Meeting, (2006), 5 pgs.

Yoon, Kwangjin et al., "Challenges in Reverse-Time Migration", SEC Int'l Exposition and 74th Annual Meeting, Denver, Colorado, (Oct. 10, 2004), 4 pgs.

* cited by examiner

SEISMIC IMAGING SYSTEMS AND METHODS EMPLOYING TOMOGRAPHIC MIGRATION-VELOCITY ANALYSIS USING COMMON ANGLE IMAGE GATHERS

BACKGROUND

Seismology is used for exploration, archaeological studies, and engineering projects that require geological information. Exploration seismology provides data that, when used in conjunction with other available geophysical, borehole, and geological data, can provide information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Traditional seismology employs artificially generated seismic waves to map subsurface structures. The seismic waves propagate from a source down into the earth and reflect from boundaries between subsurface structures. Surface receivers detect and record reflected seismic waves for later analysis. Though some large-scale structures can often be perceived from a direct examination of the recorded signals, the recorded signals must be processed to remove distortion and reveal finer detail in the subsurface image. The quality of the subsurface image is highly dependent on the accuracy of the subsurface velocity model.

Velocity analysis is the term used to describe the act of extracting velocity information from seismic data. The advanced prestack depth migration technique has become an attractive tool for velocity analysis, not only because of its sensitivity to the velocity model but also its ability to generate residual errors in the post-migration domain. A popular approach to the migration-velocity analysis (MVA) is the residual-curvature analysis on a common image point gather, which is based on residual moveout to measure velocity error. Residual-curvature analysis in areas of complex structure is a coupled migration-inversion problem that can be analyzed from a tomographic perspective. See, e.g.:

Stork, C., and R. W. Clayton, 1991, Linear aspects of tomographic velocity analysis: Geophysics, 56, 483-495.

Stork, C., 1992, Reflection tomography in the postmigrated domain: Geophysics, 57, 680-692.

Liu, Z., 1997, An analytical approach to migration velocity analysis: Geophysics, 62, 1238-1249.

Meng, Z., N. Bleistein, and K. D. Wyatt, 1999, 3D analytical migration velocity analysis I: Two-step velocity estimation by reflector-normal update: 69th Annual International Meeting, SEG, Expanded Abstracts, 1727-1730.

Zhou, H., S. H. Gray, J. Young, D. Pham, and Y. Zhang, 2003, Tomographic residual curvature analysis: The process and its components: 73rd Annual International Meeting, SEG, Expanded Abstracts, 666-669.

Under the limiting assumptions of lateral velocity homogeneity, small dip, or small offset, various approximations were derived to express the velocity updates as a function of offset in a post-migration common image point gather (CIG). In Meng, Z., P. A. Valasek, S. A. Whitney, C. B. Sigler, B. K. Macy, and N. Dan Whitmore, 2004, 3D global tomographic velocity model building: 74th Annual International Meeting, SEG, Expanded Abstracts, 2379-2382, a decoupled tomographic system was developed to address the ambiguity between velocity and depth for velocity update.

The common angle imaging (CAI) framework provides a way to exploit the redundancy in post-migrated seismic data to obtain multi-parameter estimates of subsurface properties. A 1-D velocity updating algorithm based on measured residual moveout on CAI gathers is described in Mosher, C. C., S. Jin, and D. J. Foster, 2001, Migration velocity analysis using common angle image gathers: 71st Annual International Meeting, SEG, Expanded Abstracts, 889-892. In Xia, F., Y. Ren, and S. Jin, 2006, Residual migration-velocity analysis using common angle image gathers: Presented at the 76th Annual International Meeting, SEG, the authors incorporated structural dip information into the interval velocity update and proposed a method for residual migration velocity analysis in the depth-offset ray parameter domain.

Existing seismic data processing methods do not sufficiently remove image distortion, and they continue to require excessively long computation times. Improved systems and methods are disclosed herein.

BRIEF DESCRIPTION OF THE DRAWINGS

A better understanding of the various disclosed embodiments can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description are not intended to limit the disclosed embodiments to the particular form shown, but on the contrary, the intention is to cover all modifications, equivalents and alternatives falling within the spirit and scope of the appended claims.

DETAILED DESCRIPTION

Disclosed herein are various seismic imaging systems and methods that employ a tomographic migration-velocity analysis (TMVA) using common angle image (CAI) gathers to increase efficiency. Techniques disclosed herein may extend the effectiveness of residual migration-velocity analysis (RMVA) methods that determine localized velocity model updates based on the measured residual moveout in migrated CAI gathers. The disclosed tomographic approaches employ ray theory to establish a relationship between a travel time deviation and the depth residual of a reflector in the depth-offset ray parameter $(z,p)$ domain. Using the perturbation method suggested by the tomographic approach to velocity estimation, we derive a velocity-update from the residual moveout in the depth-offset ray parameter $(z,p)$ domain.

In at least some embodiments, a disclosed seismic imaging system includes software that configures one or more processors to perform the following operations. The system obtains shot gathers for a survey region and migrates the shot gather data with an initial velocity model to obtain angle-domain common image gathers. The system processes the common image gathers to determine depth residuals and corresponding angle-dependent time deviations throughout a seismic survey region. The system solves a set of tomographic equations that relate the travel time deviations to velocity model updates. The resulting updates are applied to the velocity model and can be used to re-migrate the shot gather data. The system generates a representation of the survey region that can be displayed to a user.

Figure 1:
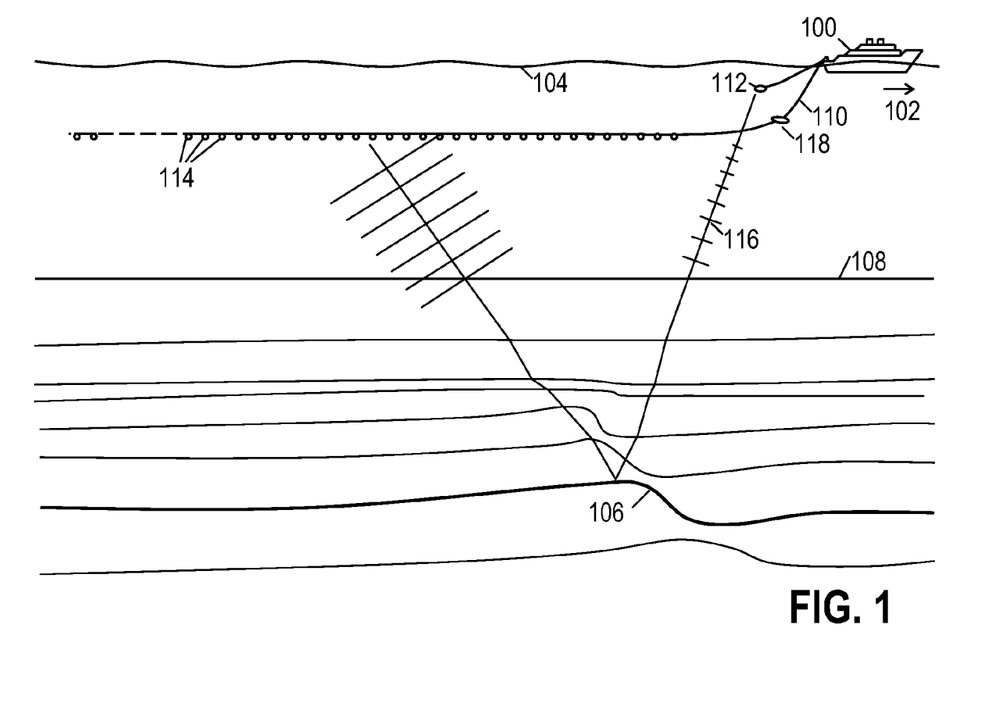
FIG. 1 shows a side view of an illustrative marine seismic survey environment.

These and other inventive aspects of the present disclosure are best understood in an illustrative context such as a marine seismic survey such as that shown in FIGS. 1-5. At sea, seismic survey ships deploy streamers behind the ship as shown in FIG. 1. Each streamer 110 trails behind the ship 100 as the ship moves forward (in the direction of arrow 102), and each streamer includes multiple evenly-spaced receivers 114. Each streamer 110 may further include a programmable diverter 118 and programmable depth controllers that pull the streamer out to an operating offset distance from the ship's path (see FIG. 2) and down to a desired operating depth (FIG. 1).

Streamers 110 may be up to several kilometers long, and are usually constructed in sections 25 to 100 meters in length that include groups of up to 35 or more uniformly spaced receivers. Each streamer 110 includes electrical or fiber-optic cabling for interconnecting receivers 114 and the seismic equipment on ship 100. Data is digitized near the receivers 114 and transmitted to the ship 100 through the cabling at rates of 7 (or more) million bits of data per second.

As shown in FIG. 1, seismic survey ship 100 can also tow one or more sources 112. Source 112 may be an impulse source or a vibratory source. The receivers 114 used in marine seismology are commonly referred to as hydrophones, and are usually constructed using a piezoelectric transducer. Various suitable types of hydrophones are available such as disk hydrophones and cylindrical hydrophones. Sources 112 and receivers 114 typically deploy below the ocean's surface 104. Processing equipment aboard the ship controls the operation of the sources and receivers and records the acquired data.

Seismic surveys provide data for imaging below the ocean surface 104 to reveal subsurface structures such as structure 106, which lies below the ocean floor 108. Analysts employ seismic imaging methods to process the data and map the topography of the subsurface layers. Seismic survey data also reveals various other characteristics of the subsurface layers which can be used to determine the locations of oil and/or gas reservoirs.

To image the subsurface structure 106, source 112 emits seismic waves 116 that are reflected where there are changes in acoustic impedance due to subsurface structure 106 (and other subsurface reflectors). The reflected waves are detected by a pattern of receivers 114. By recording (as a function of time) the arriving seismic waves 116 that have traveled from source 112 to subsurface structure 106 to receivers 114, an image of subsurface structure 106 can be obtained after appropriate data processing.

Figure 2:
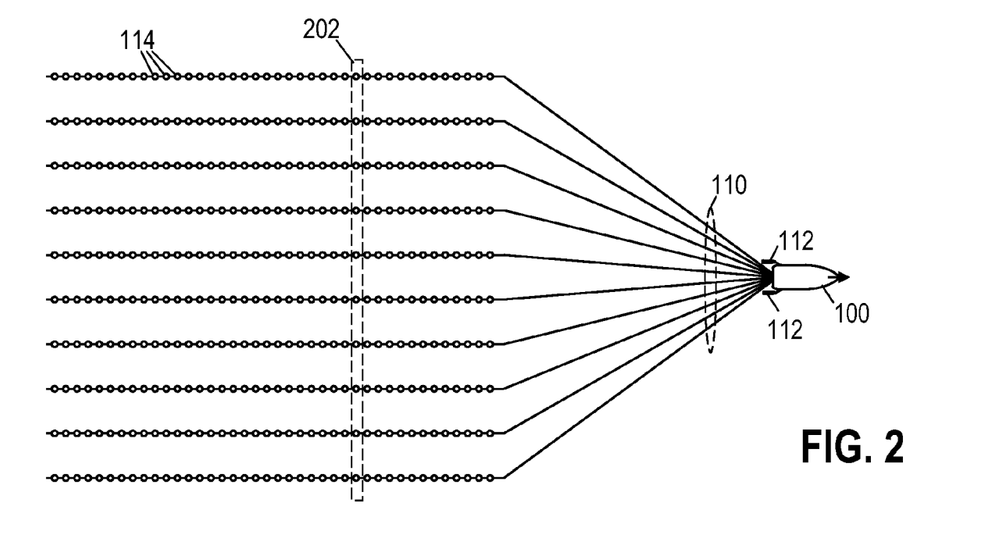
FIG. 2 shows a top view of an illustrative marine seismic survey environment.

FIG. 2 shows an overhead view (not to scale) of the seismic survey ship 100 towing a set of streamers 110 and two sources 112. As the ship 100 moves forward, the sources can be triggered alternately in a so-called flip-flop pattern. Programmable diverters are used to provide roughly even spacing between the streamers. The receivers at a given position on the streamers are associated with a common field file trace number or common channel 202.

Figure 3:
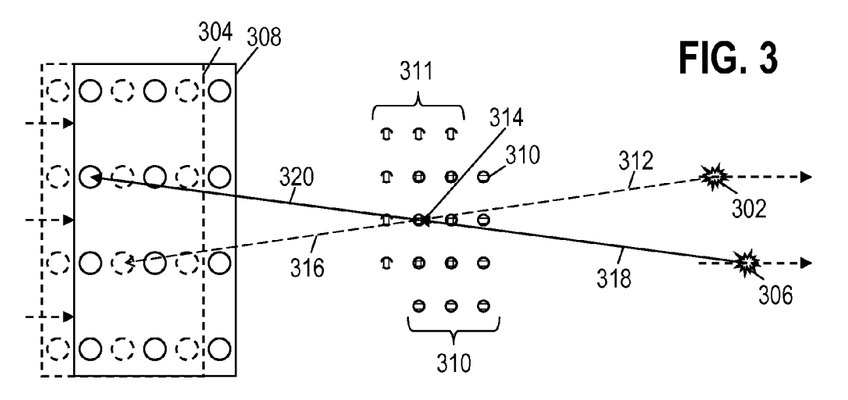
FIG. 3 shows an illustrative midpoint pattern that result from flip-flop shots received by a given channel.

FIG. 3 shows an overhead view of illustrative source and receiver positions for two shots. For a first shot, one source is triggered at position 302, and the illustrated portion of the receiver array is at position 304 (shown in broken outline). For a second shot, a source is triggered at position 306 and the illustrated portion of the receiver array is at position 308 (shown in solid outline). Assuming for the moment that the reflecting subsurface structures are horizontal, the seismic waves that reach each of the twelve receivers are reflected from a position underneath the midpoint between the source and receiver positions. Thus, the first shot produces reflections from beneath the twelve midpoints 311 (shown in broken outline with vertical crosshatching), while the second shot produces reflections from beneath the twelve midpoints 310 (shown in solid outline with horizontal crosshatching). As one example, vector 312 illustrates propagation of seismic energy from the shot 302 to a midpoint 314, and an equal length vector 316 shows the reflected seismic energy propagating to a receiver position. For the second shot 306, the vectors 318 and 320 show a similar propagation path. Note that midpoint 314 is one of the midpoints that is "hit" by multiple shots, thereby making more signal energy available from these areas when the information from the shots is processed and combined. Seismic surveys (for both land and sea) are generally designed to provide an evenly-distributed grid of midpoints with a fairly high average hit count for each midpoint.

Figure 4:
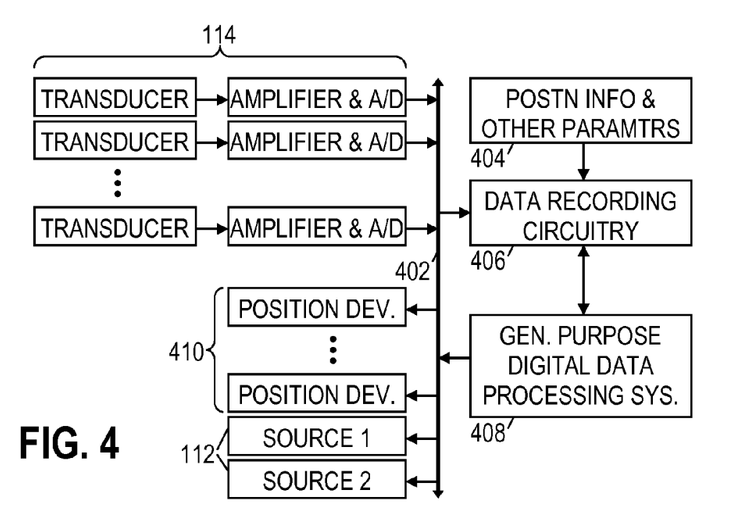
FIG. 4 shows an illustrative seismic survey recording system.

FIG. 4 shows an illustrative seismic survey recording system having the receivers 114 coupled to a bus 402 to communicate digital signals to data recording circuitry 406 on survey ship 100. Position information and other parameter sensors 404 are also coupled to the data recording circuitry 406 to enable the data recording circuitry to store additional information useful for interpreting the recorded data. Illustratively, such additional information may include array orientation information and velocity information.

A general purpose digital data processing system 408 is shown coupled to the data recording circuitry 406, and is further shown coupled via bus 402 to positioning devices 410 and seismic sources 112. Processing system 408 configures the operation of recording circuitry 406, positioning devices 410, and seismic sources 112. Recording circuitry 406 acquires the high speed data stream(s) from receivers 114 onto a nonvolatile storage medium such as a storage array of optical or magnetic disks. Positioning devices 410 (including programmable diverters and depth controllers) control the position of receivers 114 and sources 112.

The seismic recording system of FIG. 4 may include additional components not specifically shown here. For example, each streamer 110 could have an independent bus 402 for coupling to the data recording circuitry. Processing system 408 includes a user interface having a graphical display and a keyboard or other method of accepting user input, and it can further include a network interface for communicating stored seismic survey data to a central computing facility having powerful computing resources for processing the seismic survey data.

Figure 5:
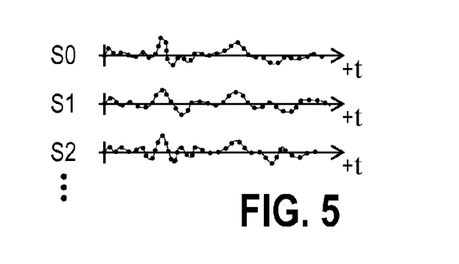
FIG. 5 shows an illustrative set of traces.

FIG. 5 shows illustrative seismic signals (also called "traces") detected and sampled by receivers 114. The signals indicate some measure of seismic wave energy as a function of time (e.g., displacement, velocity, acceleration, pressure), and they are digitized at high resolution (e.g., 24 bits) at a programmable sampling rate. Such signals can be grouped in different ways, and when so grouped, they are called a "gather". For example, a "common midpoint gather" is the group of traces that have a midpoint within a defined region. A "shot gather" is the group of traces recorded for a single firing of the seismic source. A "multi-shot gather" is a group of shot gathers, often including all the traces recorded along a sail line in a marine seismic survey.

The recorded seismic survey data is of little use when maintained in the format of FIG. 5. Although it is possible to plot the various recorded waveforms side by side in a plot that reveals large scale subsurface structures, such structures are distorted and finer structures cannot even be seen. Hence the data is processed to create a data volume, i.e., a three dimensional array of data values such as that shown in FIG. 6. The data volume represents some seismic attribute throughout the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The volumetric data format more readily lends itself to computational analysis and visual rendering, and for this reason, the data volume may be termed a "three-dimensional image" of the survey region.

Figures 6, 7:
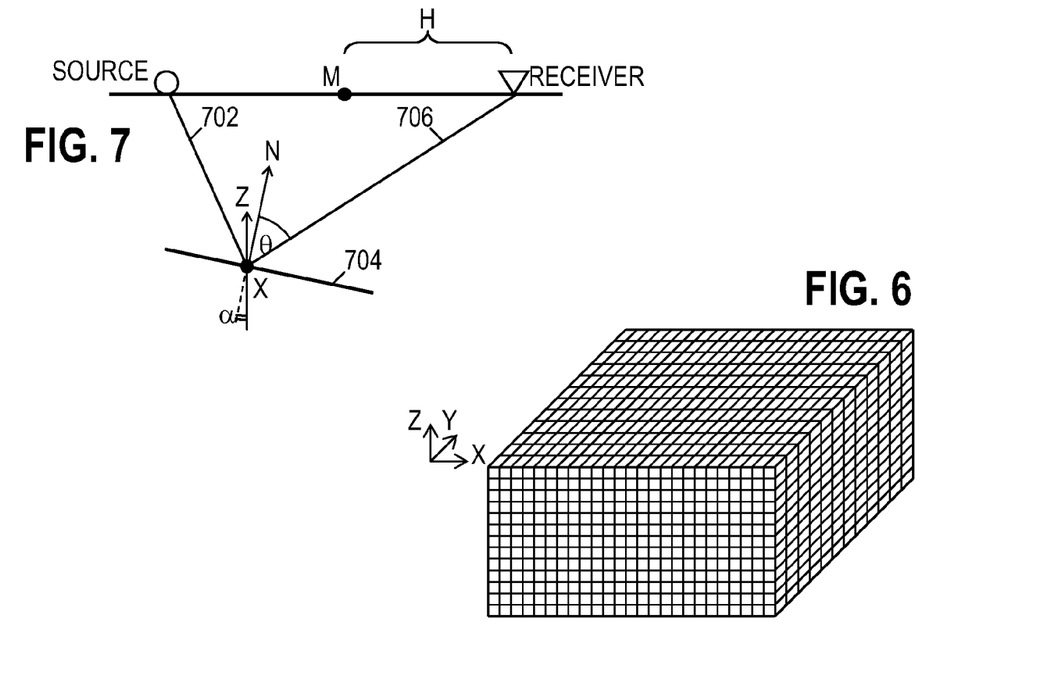
FIG. 6 shows an illustrative data volume in three dimensions.
FIG. 7 shows an illustrative shot geometry.

FIG. 7 shows how various parameters relate to the geometry of an illustrative shot in two-dimensions (the 3D case is similar). Seismic energy propagates along ray 702 from a seismic source to a target interface 704 and reflects towards a receiver along ray 706. At the reflection point (represented elsewhere by an (x,y,z) coordinate and abbreviated here as a vector $\vec{x}$), the surface 704 has a normal vector $\vec{n}$ at an angle $\alpha$ to the vertical. The incoming ray 702 and reflected ray 706 are at equal (but opposite) "opening" angles $\theta$ relative to the normal vector.

With this understanding of the shot geometry, we now turn to a discussion of seismic data migration and common angle image gathers. The seismic trace data initially gathered during a survey is acquired as a function of shot location, receiver location, and time, i.e. P(s,r,t). Traditionally a change of variable is performed to place this data in the midpoint-offset-time domain, i.e., P(m,h,t), where midpoint m=(s+r)/2 and offset h=|s−r|/2. Observing that this data represents the wavefields observed at the surface (z=0), the wavefield equation is employed to extrapolate the subsurface wavefield, a process known as migrating the data. The fundamentals for this process are described in Chapter 1 of Jon F. Claerbout, *Imaging the Earth's Interior*, Blackwell Scientific Publications, Oxford, 1985. In the interim, many new wave-equation based migration techniques have been developed and can be employed to obtain the subsurface data volume.

One such migration technique is described in Marie L. Prucha, Biondo L Biondi, and William W. Symes, "Angle-domain common image gathers by wave-equation migration", Stanford Exploration Project, Report 100, Apr. 20, 1999, pp. 101-113, and can be summarized as follows:

$$P(m, h, t; z = 0) \xrightarrow{FT} P(m, h, \omega; z = 0) \quad (1)$$

$$P(m, h, \omega; z = 0) \xrightarrow{DSR} P(m, h, \omega; z) \quad (2)$$

$$P(m, h, \omega; z) \xrightarrow{Slant\ Stack} P(m, p_h, \tau; z) \quad (3)$$

$$P(m, p_h, \tau; z) \xrightarrow{Imaging} P(m, p_h, \tau = 0; z) \quad (4)$$

The first equation represents a Fourier transform of the data set to place the data acquired at the surface (z=0) in the midpoint-offset-frequency domain. The second equation represents the migration of the data set using the well-known double square root (DSR) equation for extrapolating a wavefield. (See, e.g., Biondi and Palacharla, 1996, 3-D prestack migration of common-azimuth data: Geophysics, 61, 1822-1832). The third equation represents a Radon transform, which is also termed a slant stack operation, of the data into the midpoint-p-tau domain (see e.g., U.S. Pat. No. 4,779, 238). Offset ray parameters p and tau represent slope and intercept of slant lines used to stack the data.

As indicated by the fourth equation, setting tau equal to zero provides a set of angle-domain common-image gathers, which can be viewed as a set of images P(m,z), each image being derived from seismic energy impacting the reflector at a different angle. The offset ray parameter $p_h$ is related to the local dip $\alpha$ and open angle $\theta$ by the equation:

$$p_h = 2S(m,z)\cos\alpha\sin\theta, \quad (5)$$

where S(m,z) is the slowness (the inverse of acoustic velocity V(m,z)) in the neighborhood of the reflector. (Because velocity and slowness have a one-to-one relationship, these terms are sometimes used interchangeably.)

Tomographic Migration Velocity Analysis (TMVA) is a technique for determining and/or refining a velocity model based on depth mismatches in common image gathers. The principles of the TMVA technique are described in T. Nemeth, "Tomographic Migration Velocity Analysis on a Salt Model", 1995, UTAM Midyear Report. The angle-domain common image gathers P(m,$p_h$,z) enable a particularly efficient determination of the depth perturbations to be used when refining a velocity model.

In the post-migrated angle domain, the seismic data P(m, $p_h$,z) represent the depth positions of multiple images of the reflector location. Use of a correct velocity-depth model V(m, z) in migration generates flat CAI gathers in the $p_h$-z domain (i.e., reflectors appear as events at a constant depth z, irrespective of $p_h$). Otherwise depth residuals are present on the CAI gathers, meaning that the event depth varies with $p_h$). The choice of the reference depth in practice depends on the tomographic updating strategies as described by Zhou, H., S. H. Gray, J. Young, D. Pham, and Y. Zhang, 2003, Tomographic residual curvature analysis: The process and its components: 73rd Annual International Meeting, SEG, Expanded Abstracts, 666-669.

To adapt depth residuals in the $p_h$-z domain to TMVA approach, they are converted to travel time perturbations $\Delta t(p_h)$, which reflect the residual moveout of a specular raypath. Having chosen a reference depth, the depth residuals $\Delta z$ from the reference depth at the location of reflector can be determined using a semblance calculation between common images calculated at different angles in the angle-domain common image gathers. The conversion from depth residual to travel time perturbation in the in the $p_h$-z domain can be expressed:

$$\Delta t(p_h) = \Delta z \sqrt{4S^2\cos^2\alpha - p_h^2}, \quad (6)$$

where S is the local slowness above the reflector perturbation and $\alpha$ is the local dip angle of the reflector.

Equation (6) calculates the travel time perturbation caused by the extra path length that a ray must travel due to the depth deviation. The dependence of travel time perturbation on the dip angle of reflector is mild for small dips but becomes significant at larger ones. Note that if the incident angle $\theta$ is desired it can be obtained without ray tracing using equation (5). As a result, the travel time perturbations calculated from CAI gathers are insensitive to raypath errors, allowing use of a faster ray tracing algorithm.

Given the initial velocity model and the postmigrated seismic data, a linear system of tomographic updating equations can be built by incorporating raypaths traced through the initial velocity model from reference reflectors with residual errors of data, i.e. residual moveout on migrated CAI gathers. In the tomographic approach, raypaths are employed to construct the equation system for velocity estimation. Specular raypaths and the velocities they encounter provide all the information required to establish an equation system that determines what part of the velocity field needs to be updated to reduce the depth or travel time errors to velocity perturbations.

According to the ray theory, travel time is a linear integral of the slowness along raypath. Suppose that the raypath errors through the reference model to be easily reduced by re-tracing through the inverted velocity field, the raypath travel time discrepancy $\Delta t(p_h)$ between true velocity model traced from the true reflector and reference velocity model traced from the given reflector can be approximated by $$\Delta t(p_h) = L(p_h) \cdot \Delta S + \Delta L(p_h) \cdot S, \quad (7)$$

where $\Delta S$ is the slowness perturbation from the true velocity model; $S$ is the slowness along the raypath; $L(p_h)$ is the raypath length of the specular ray; and $\Delta L(p_h)$ is the deviation of raypath length specular ray from the true reflector.

By introducing a reference ray of normal incident to the given reflector and the extra distance traveled by a ray due to an infinitesimal reflector perturbation, the ambiguity between velocity and depth perturbations can be addressed and the tomographic updating equation can be derived as follows $$\left[ \frac{L(p_h)}{\cos\theta} - L(p_h = 0) \right] \cdot \Delta S = \frac{\Delta t(p_h)}{\cos\theta} \quad (8)$$

where $\theta$ is the incident angle. This equation is related to the offset domain formula proposed by Meng, Z., P. A. Valasek, S. A. Whitney, C. B. Sigler, B. K. Macy, and N. Dan Whitmore, 2004, 3D global tomographic velocity model building: 74th Annual International Meeting, SEG, Expanded Abstracts, 2379-2382. The depth perturbation from the true depth in the z-$p_h$ domain can be obtained by the following equation:

$$\Delta \hat{z}(p_h) = \frac{\Delta L(p_h)}{2\cos\alpha\cos\theta} \quad (9)$$

where $\alpha$ is the local dip angle obtained beforehand from the migrated stack image.

The process of the tomographic migration-velocity analysis (TMVA) is a global inversion technique which can be divided into three components: (a) the choice of model parameterization; (b) building of the linear system of tomographic updating equations that incorporate raypaths traced through the initial velocity model with the data residual errors; and (c) solving the equation system by back-projecting these errors along the raypaths.

Figure 8:
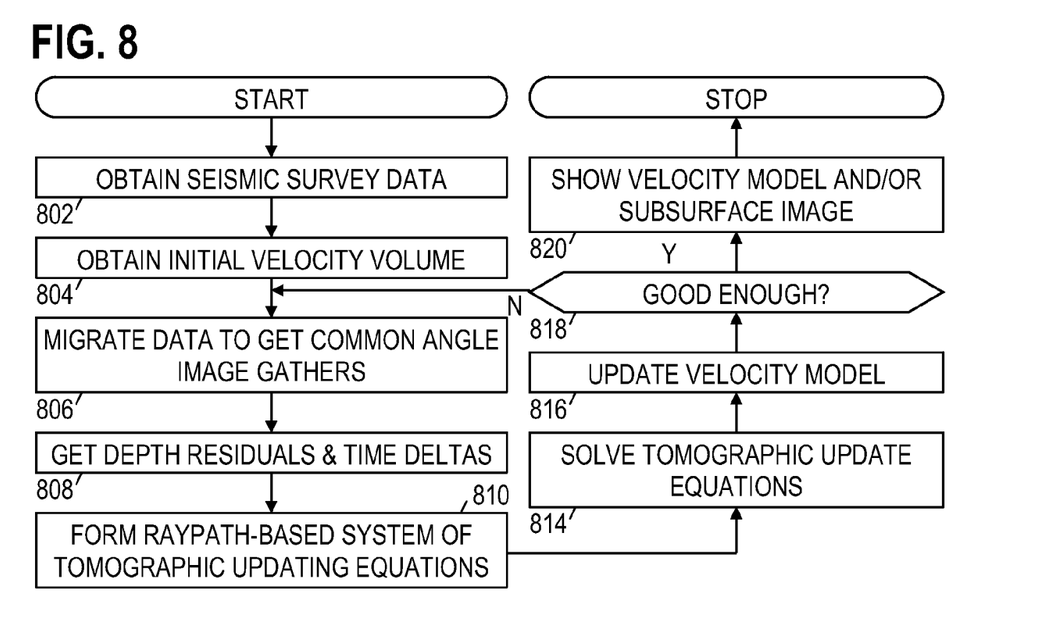
FIG. 8 shows a flowchart of an illustrative seismic imaging method.

FIG. 8 shows a flowchart for an illustrative implementation of a common angle image gather-based TMVA that can be carried out by a data processing system configured with the appropriate software. Beginning in block 802, the system obtains seismic survey data and, if necessary, transforms it into the appropriate domain (e.g., the midpoint-offset-frequency domain). The seismic survey data, which may have been gathered as outlined previously, is generally stored in a structured form in a disk array to enable high bandwidth accessibility by a parallel processing computer system.

In block 804, the system loads an initial velocity volume, i.e., an indication of seismic velocities at each point in the region of interest. The initial velocity volume can be arbitrary, although faster convergence is expected with the velocity volume is derived from the seismic survey data. See, e.g., Jon F. Claerbout, *Fundamentals of Geophysical Data Processing*, p. 246-56, which is hereby incorporated herein by reference. Alternatively, the velocity volume can be at least partly derived from other sources, e.g., well logs and/or expert judgment of the analyst. Initial stacking and analysis of the seismic traces generally reveals the rough outline of subsurface structures in the region of interest, which can be used in forming the initial velocity volume.

In block 806 the system migrates the data to obtain a set of angle domain common image gathers. In block 808, the system analyzes the gathers, e.g., calculating differential semblance to determine the depth residuals $\Delta z$, from which travel time perturbations $\Delta t(p_h)$ can be found in accordance with equation (6). Other similarity measures (e.g., cross-correlation) can alternatively be used to find the depth residuals.

In block 810, the system performs ray tracing from significant reflectors up through the velocity model to measure raypath lengths $L(p_h)$, thereby determining a system of tomographic update equations based on equation (8). A set of specular rays from each of the CAI points are traced toward the surface, regularly spaced in offset ray parameter. Each of these rays consists of two branches emerging from the imaging point to the surface. (Further discussion of ray tracing techniques is provided in Langan, R. T., Lerche, I., and Cutler, R. T., "Tracing of rays through heterogeneous media: An accurate and efficient procedure", Geophysics, 50(9), 1985, pp. 1456-1465.) The system assumes fixed positions for the reference reflector from which the upward ray tracing is performed. Such fixed positions can be estimated by picking events on the postmigrated stack image before tomography begins.

The raypath length information can be stored in the form of a sparse Jacobian matrix. In block 814, the system solves the system of equations with a global least-squares inversion solver using geological constraints and regularization in data and model space, thereby obtaining slowness updates $\Delta S$. The geological constraints include specifying a valid ray-tracing dataset for inversion and limiting the maximum and/or minimum velocity for the updated velocity model. The inversion process can employ a classical regularization method, ensuring first-order derivative smoothness or second-order derivative smoothness in both horizontal and vertical directions. The system applies the slowness updates to the velocity model in block 816.

In block 818, the system determines whether or not an additional iteration would be desirable. Various criteria can be used to make this determination, including comparing the slowness updates or the depth residuals to a predetermined threshold, checking whether the iteration count has reached a predetermined limit, and/or determining whether the CAI gathers have converged to a steady state. Quality control can be readily performed by comparing re-migrated data to CAI gathers updated using equation (9).

In block 820, the system outputs the updated velocity model and CAI gathers for subsequent processing and/or display to a user. The data can be presented as a 2D or 3D image of the subsurface structure and various properties of the subsurface representations.

It is contemplated that the operations shown in FIG. 8 may be implemented in the form of software, which can be stored in computer memory, in long-term storage media, and in portable information storage media. It should be noted that illustrative method of FIG. 8 is provided as an explanatory aid. In practice, the various operations shown in FIG. 8 may be performed in different orders and are not necessarily sequential. For example, seismic data processing can benefit substantially from parallelism. In some processing method embodiments, data from different survey regions may be processed independently. In other embodiments, the operations may be "pipelined" so that individual reflectivity contributions are determined by operations in the sequence shown, even though the operations are all occurring concurrently. Additional operations may be added to the illustrative method and/or several of the operations shown may be omitted.

Figure 9:
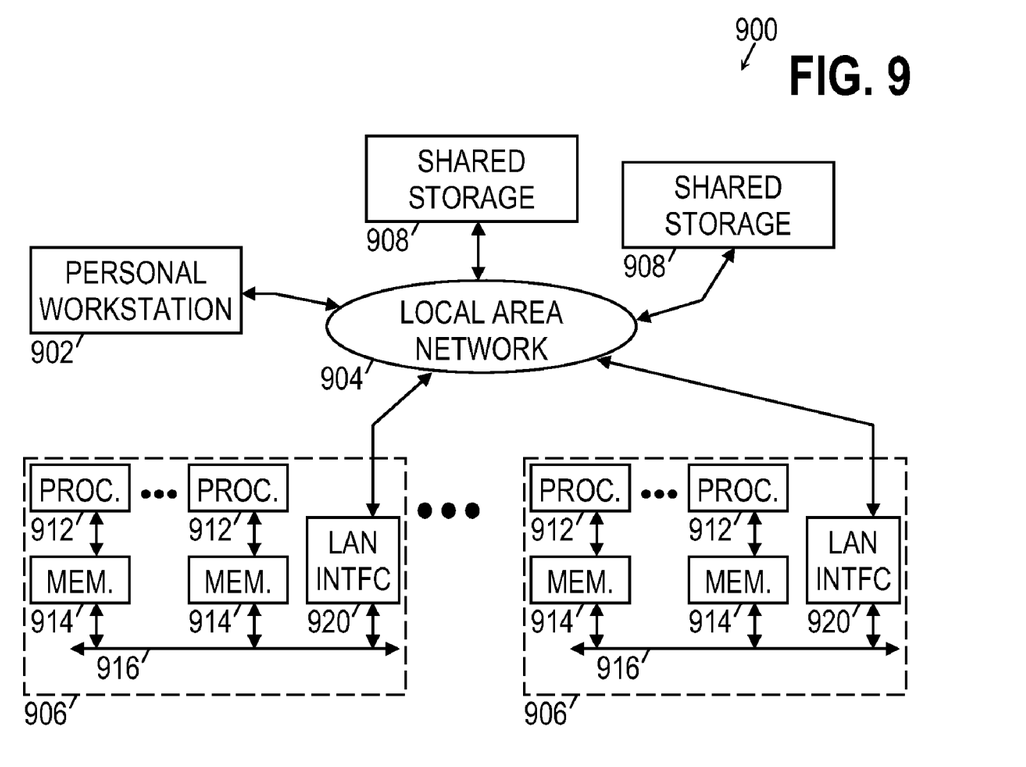
FIG. 9 shows an illustrative imaging system.

FIG. 9 shows an illustrative computer system 900 for performing seismic data processing including seismic imaging using tomographic migration-velocity analysis of common angle image gathers. A personal workstation 902 is coupled via a local area network (LAN) 904 to one or more multi-processor computers 906, which are in turn coupled via the LAN to one or more shared storage units 908. Personal workstation 902 serves as a user interface to the processing system, enabling a user to load survey data into the system, to retrieve and view image data from the system, and to configure and monitor the operation of the processing system. Personal workstation 902 may take the form of a desktop computer with a graphical display that graphically shows survey data and 3D images of the survey region, and with a keyboard that enables the user to move files and execute processing software.

LAN 904 provides high-speed communication between multi-processor computers 906 and with personal workstation 902. The LAN 904 may take the form of an Ethernet network.

Multi-processor computer(s) 906 provide parallel processing capability to enable suitably prompt conversion of seismic trace signals into a survey region image. Each computer 906 includes multiple processors 912, distributed memory 914, an internal bus 916, and a LAN interface 920. Each processor 912 operates on an allocated portion of the input data to produce a partial image of the seismic survey region. Associated with each processor 912 is a distributed memory module 914 that stores conversion software and a working data set for the processor's use. Internal bus 916 provides inter-processor communication and communication to the LAN networks via interface 920. Communication between processors in different computers 906 can be provided by LAN 904.

Shared storage units 908 may be large, stand-alone information storage units that employ magnetic disk media for nonvolatile data storage. To improve data access speed and reliability, the shared storage units 908 may be configured as a redundant disk array. Shared storage units 908 initially store a initial velocity data volume and shot gathers from a seismic survey. The (iteratively-updated) common angle image gathers can be temporarily stored on shared storage units 908 for later processing. In response to a request from the workstation 902, the image volume data can be retrieved by computers 906 and supplied to workstation for conversion to a graphical image to be displayed to a user.

Numerous variations and modifications will become apparent to those skilled in the art once the above disclosure is fully appreciated. It is intended that the following claims be interpreted to embrace all such variations and modifications.

What is claimed is:

1. A seismic imaging method that comprises:
obtaining shot gathers for a survey region;
migrating shot gather data with an initial velocity model to obtain angle-domain common image gathers;
determining angle-dependent travel time deviations;
solving a set of tomographic equations that relate the travel time deviations to velocity model updates, wherein said solving includes performing a global least-squares inversion with regularization, subject to geological constraints;
applying the updates to the velocity model; and
displaying a representation of the survey region to a user based at least in part on the updated velocity model.

2. The method of claim 1, further comprising re-migrating the shot gather data using the updated velocity model.

3. The method of claim 2, further comprising repeating said determining, solving, applying, and re-migrating operations until a migration convergence is achieved.

4. The method of claim 1, wherein said determining the angle-dependent travel time deviations comprises:
measuring similarity between common image gathers at different angles to obtain depth residuals $\Delta z$;
determining a local dip angle $\alpha$ from the migrated data; and
calculating the angle-dependent travel time perturbations based at least in part on the depth residuals and the local dip angle.

5. The method of claim 4, wherein the angle-dependent travel time perturbations are expressible in the form $$\Delta t(p_h) = \Delta z \sqrt{4S^2 \cos^2 \alpha - p_h^2},$$

where S is a local slowness value, $p_h$ is an offset ray parameter that includes a dependence on a specular reflection angle $\theta$.

6. The method of claim 1, wherein the set of tomography equations are based on the relationship:

$$\left[\frac{L(p_h)}{\cos\theta} - L(p_h = 0)\right] \cdot \Delta S = \frac{\Delta t(p_h)}{\cos\theta}$$

where $L(p_h)$ is the path length of a specularly reflected ray having offset ray parameter $p_h$ at a given reflection point, $\theta$ is the reflection angle, $\Delta S$ is a change in slowness, and $\Delta t(p_h)$ are the angle-dependent travel time perturbations.

7. The method of claim 1, wherein said representation of the survey region comprises shot gather data migrated using the updated velocity model.

8. A seismic imaging system that comprises:
at least one storage device that stores shot gathers from a seismic survey of a given survey region;
a memory that stores seismic imaging software; and
at least one processor coupled to the memory to execute the seismic imaging software, wherein the software configures the at least one processor to:
retrieve shot gather data from the storage device;
migrate the shot gather data with an initial velocity model to obtain angle-domain common image gathers;
determine angle-dependent travel time deviations;
solve a set of tomographic equations that relate the travel time deviations to velocity model updates, wherein as part of said solving, the software configures the at least one processor to perform a global least-squares inversion with regularization, subject to geological constraints;

apply the updates to the velocity model; and display a representation of the survey region to a user based at least in part on the updated velocity model.

9. The system of claim 8, wherein the software further configures the at least one processor to re-migrate the shot gather data using the updated velocity model.

10. The system of claim 9, wherein the software further configures the at least one processor to repeat said determining, solving, applying, and re-migrating operations until a migration convergence is achieved.

11. The system of claim 8, wherein as part of determining the angle-dependent travel time deviations, the software configures the at least one processor to:

measure similarity between common image gathers at different angles to obtain depth residuals $\Delta z$;

determine a local dip angle $\alpha$ from the migrated shot gather data; and calculate the angle-dependent travel time perturbations based at least in part on the depth residuals and the local dip angle.

12. The system of claim 11, wherein the angle-dependent travel time perturbations are expressible in the form $$\Delta t(p_h) = \Delta z \sqrt{4S^2 \cos^2 \alpha - p_h^2},$$

where S is a local slowness value, $p_h$ is an offset ray parameter that includes a dependence on a specular reflection angle $\theta$.

13. The system of claim 8, wherein the set of tomography equations are based on the relationship:

$$\left[ \frac{L(p_h)}{\cos \theta} - L(p_h = 0) \right] \cdot \Delta S = \frac{\Delta t(p_h)}{\cos \theta}$$

where $L(p_h)$ is the path length of a specularly reflected ray having offset ray parameter $p_h$ at a given reflection point, $\theta$ is the reflection angle, $\Delta S$ is a change in slowness, and $\Delta t(p_h)$ are the angle-dependent travel time perturbations.

14. The system of claim 8, wherein said representation of the survey region comprises shot gather data re-migrated using the updated velocity model.

15. The method of claim 1, further comprising determining the set of tomographic equations based on measuring raypath lengths associated with significant reflectors, and storing the raypath lengths as elements of a sparse Jacobian matrix.

16. The method of claim 1, further comprising specifying a valid ray-tracing dataset for inversion as one of the geological constraints.

17. The method of claim 1, further comprising specifying a maximum or minimum velocity for the velocity model updates as one of the geological constraints.

18. The system of claim 8, wherein the software further configures the at least one processor to determine the set of tomographic equations based on measuring raypath lengths associated with significant reflectors, and to store the raypath lengths as elements of a sparse Jacobian matrix.

19. The system of claim 8, wherein the software further configures the at least one processor to specify a valid ray-tracing dataset for inversion as one of the geological constraints.

20. The system of claim 8, wherein the software further configures the at least one processor to specify a maximum or minimum velocity for the velocity model updates as one of the geological constraints.

\* \* \* \* \*